2,740,036

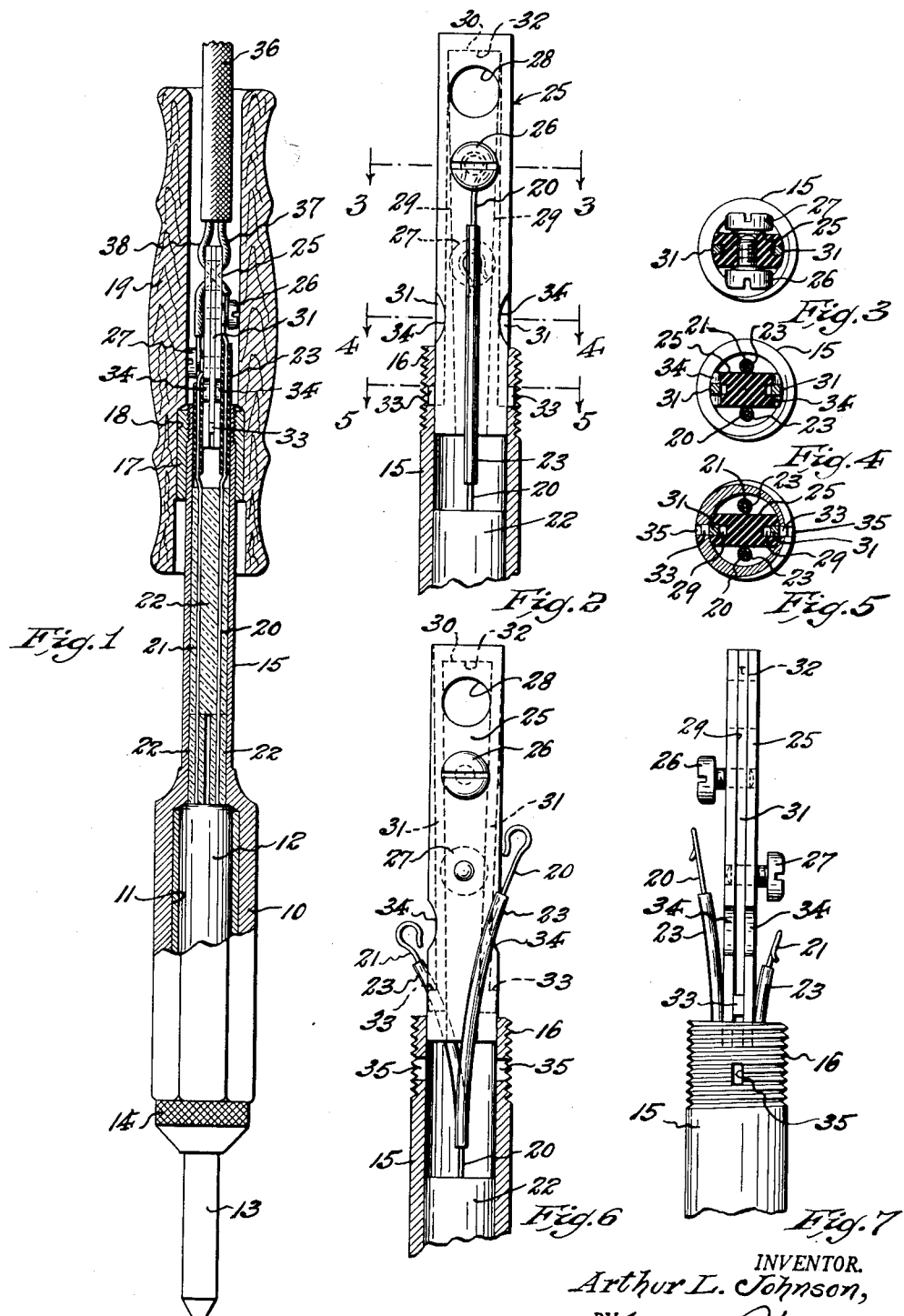

ELECTRIC SOLDERING IRON WITH READILY DETACHABLE TERMINAL PLATE

Arthur L. Johnson, Roselle Park, N. J., assignor to Hexacon Electric Company, Roselle Park, N. J., a firm Application April 15, 1952, Serial No. 282,318

4 Claims. (Cl. 219—26)

This invention relates to electric soldering irons; and the invention has reference, more particularly, to an improved construction of readily detachable terminal plate which carries the terminal posts or screws by which the leads of the heating element of the soldering iron are joined in circuit with the conductors of the cable or cord by which electrical current is served to said heating element.

In electric soldering irons as heretofore constructed, the leads of the heating element extend upwardly through the tubular shank of the iron to a terminal plate of electrically non-conductive material, which is anchored across the bore of said shank to project outwardly therefrom, and which is secured to the shank by a rivet extending transversely therethrough and through the shank walls to which its ends are riveted. Between the walls of the shank and opposite faces of the thus assembled terminal plate are passages through which the leads of the heating element must be fished, whereby to reach the terminal posts or screws carried by the terminal plate and to which their ends are required to be engaged, such operation being very laborious and time consuming.

Another disadvantage of such riveting fastening is that, due to the close proximity of the rivet to the heating element leads, there is risk of dielectric leak, and possibility of short circuiting of the soldering iron. Furthermore, the terminal plate is weakened by the extension of the rivet therethrough, which involves risk of its breakage and consequent necessity for replacement.

In addition to the above recited disadvantages, if, during the life of the soldering iron, it becomes necessary to replace its heating element, and in connection with this operation to detach the terminal plate, it becomes necessary to cut-off a rivet head and drive out the rivet, which is also a laborious and time consuming operation; and furthermore may require reboring and enlarging of the rivet receiving openings to accommodate a larger rivet, so as to avoid possibility of undesirable loose fit.

Having the disadvantages of a rivet fastened terminal plate for an electric soldering iron in view, it is an object of this invention to provide a readily detachable terminal plate having novel means for anchoring the same in operative assembled relation to the tubular shank of a soldering iron; and anchoring means being of such character as to be hand manipulatable without use of tools, whereby to quickly attach or detach the terminal plate relative to the soldering iron shank, and especially adapted for attachment of the terminal plate to said shank, after the leads of the heating element of the iron are projected from said shank, by mere insertion of the terminal plate between the exteriorly projected end portions of such leads and into the shank end.

Another object of the invention is to provide a readily detachable terminal plate having the hand manipulatable anchoring means therefor so related thereto as to serve as reenforcement of said terminal plate against breakage.

Other objects and advantages of this invention will become apparent from the following description taken in connection with the accompanying drawings, in which:

Fig. 1 is a longitudinal sectional view in part elevation showing an electric soldering iron equipped with the readily detachable terminal plate according to this invention.

Fig. 2 is an enlarged fragmentary view showing the terminal plate according to this invention in operative attached relation to the shank of an electric soldering iron with the leads of the iron heating element connected to its terminal posts or screws; Fig. 3 is a cross-sectional view, taken on line 3—3 in Fig. 2; Fig. 4 is a cross-sectional view, taken on line 4—4 in Fig. 2; and Fig. 5 is another cross-sectional view, taken on line 5—5 in Fig. 2.

Fig. 6 is a view similar to that of Fig. 2, but showing the terminal plate released from the shank of the soldering iron and from the iron heating element leads, ready to be attached or detached from the soldering iron shank; and Fig. 7 is a side elevational view, viewed from the right with respect to Fig. 6.

Similar characters of reference are employed in the above-described views, to indicate corresponding parts.

Referring to Fig. 1, which shows a conventional electric soldering iron structure, the reference character 10 indicates the hollow head of said iron, which is provided with a bore 11 in which is enclosed the heating element 12. Extending axially into the heating element 12, subject to heating thereby is the iron tip member 13, which projects exteriorly from the free end of the head 10, and which is secured in operative assembled relation to the latter by the keeper nut 14, in manner already well known to the art. Said head 10 is provided with an axially extending tubular shank 15. This shank 15 is provided with an externally screw-threaded free end portion 16, which screws into a coupling element 17 which is fixedly imbedded in the inner end of the bore 18 of the iron hand grip member 19, thus removably attaching the latter in operative assembled relation to the iron. The leads 20 and 21 of the heating element 12 extend therefrom through the shank 15, with their free end portions projecting exteriorly from the latter. Arranged within the interior of the shank 15 are insulating members 22 through which said leads 20 and 21 pass, and by which the same are insulated from said shank. Said members 22 are made of a suitable electrically non-conductive material, such as porcelain. The free end portions of said leads 20 and 21 are also provided with insulating sheaths 23.

The reference character 25 indicates a terminal plate made according to this invention, and which comprises a suitably electrically non-conductive material, such as vulcanized fiber. Said terminal plate is of substantial thickness and of a width corresponding to the internal diameter of the shank 15, so that a lower end portion thereof is insertable into said shank, subject to being secured to the latter in such relation thereto that a major portion of the length of said terminal plate extends outwardly from the shank end. Threaded into the externally projecting portion of said terminal plate, respectively from opposite faces thereof, and intermediate the free end thereof and the end of said shank 15, are a pair of longitudinally spaced apart terminal posts or screws 26 and 27, to which the leads 20 and 21 of the heating element 12 can be connected. Adjacent its outer end, the terminal plate 25 is provided with a through opening 28 for the purpose subsequently explained. Indenting the respective side edges of the terminal plate 25, to extend longitudinally through the terminal plate body from end to end thereof, are channels or grooves 29. Preferably these longitudinal channels or grooves are connected at their upper or outer ends by a transverse channel or groove 30, which indents the outer or free end of the terminal plate 25. Said longitudinal channels or grooves 29 are so formed as to gradually increase in depth toward the lower or inner end of the terminal plate. Housed in the channels or grooves 29—30 of the terminal plate is an inverted U-shaped latching member made of springy metal, the legs of which provide inwardly yieldable latch arms 31, which respectively extend longitudinally downward through the respective longitudinal channels or grooves 29 of the terminal plate from a cross-head 32 which is seated in said transverse channel or groove 30 of said terminal plate. Formed integral with and so as to project laterally outward from the free ends of said latch arms 31, are latch pieces 33. The walls of the longitudinal channels or grooves 29 are indented by clearance notches 34 which respectively open out from opposite exterior margins of the terminal plate 25, so as to expose the latch arms 31 subject to manipulation by an operator's fingers. Provided in the walls of the free end portion of the shank 15 are diametrically aligned latching sockets or openings 35.

Before assembling the terminal plate 25 in operative relation to the shank 15, the leads 20 and 21 of the heating element 12 can be extended through said shank, so that their free end portions project from the open end of the latter, thus avoiding necessity for laborious and time consuming threading of said leads through restricted passages between a previously attached riveted terminal plate and the walls of said shank.

The hand grip member being detached and removed from the shank 15, to apply and attach the terminal plate of this invention to said shank, said terminal plate can be passed downwardly between the projecting end portions of the heating element leads 20 and 21, and its lower end portion then inserted into the open end of said shank, whereupon the operator, by engaging the opposite latch arms 31 respectively by a finger and thumb where exposed by the clearance notches 34, can by in-squeezing force, press inward said latch arms 31, thus retracting the latch pieces 33 within the width limits of the terminal plate (see Figs. 6 and 7). This having been done, the terminal plate is downwardly thrust axially into the shank 15 until the retracted latch pieces 33 are disposed in alignment with the latching sockets or openings 35 of the walls of said shank 15, whereupon the latch arms 31 are released so that their tensional reaction will cause the latch pieces 33 to enter said latching sockets or openings 35, and thus securely anchor the terminal plate in operative attached relation to the shank 15. This having been accomplished, the respective leads 20 and 21 of the heating element can be respectively engaged around the respective loosened terminal posts or screws 26 and 27.

After the terminal plate 25 in thus attached in place, and the heating element leads 20 and 21 connected as described, the conductors of a current service cable or cord can thereupon be operatively connected to the iron. To accomplish this, the detached hand grip member 19 is threaded over the service cable or cord 36, and the projecting end portions of the respective conductors 37 and 38 of said cable or cord are passed through the opening 28, respectively from opposite faces of the terminal plate 25, and are led thence respectively to the terminal posts or screws 26 and 27, to which they are connected so as to be joined thereby to the respective heating element leads 20 and 21, when said terminal posts or screws are tightened thereupon. The threading of the conductors 37 and 38 through the terminal plate opening 28, serves to snub the same against longitudinal movement likely to accidentally disconnect them from the terminal posts or screws 26 and 27.

After the cable or cord 36 is operatively connected with the iron, the hand grip member 19 is moved down thereover, and then attached to the shank 15 by threading the coupling element thereto, whereupon the iron is ready for use.

Although it is preferable to provide a resilient latch arm 31 and the latch piece 33 carried thereby at each side edge of the terminal plate 25, this is not necessarily essential, since a single latch arm and latch piece mounted in connection with but one side edge of the terminal plate can, in cooperation with a corresponding single opening 35 in the wall of the shank 15, effectively secure the terminal plate in detachably anchored relation to the shank, and therefore the latter arrangement is also comprehended by this invention.

From the above, it will be obvious that the terminal plate 25 and its novel hand manipulatable latching means for securing the same in assembled connection with the shank of the soldering iron, provides means for quickly and easily attaching and detaching the terminal plate without necessity for use of tools, and this both with respect to initial production of the iron as well as in connection with repairs thereof, especially such as involve replacement of the heating element of the iron. Not only is this the case, but also the novel latching means is so related to the terminal plate and its terminal posts or screws as to effectively guard against likelihood of dielectric leaks and short circuiting of the heating element, while at the same time serving to reenforce the terminal plate against breakage.

Having now described my invention, I claim:

1. In an electric soldering iron having a head equipped with an electric heating element, said head having an outwardly open tubular shank through which leads of said heating element extend, a non-conductive flat terminal plate of width corresponding to the internal diameter of said shank, whereby the inner end portion of said terminal plate can be entered in the open end of said shank with its outer end portion projecting exteriorly from the latter, said terminal plate having in at least one side margin thereof an outwardly open longitudinal channel coextensive therewith and increasing in depth toward the inner end of the terminal plate, a yieldable latch arm fixed by one end to the outer end portion of the terminal plate and disposed within said channel for dependent extension therethrough normally flush with the adjacent side margin of the terminal plate, a latch piece outwardly projecting from the free end portion of said latch arm, the wall of said shank having an opening to normally receive said latch piece so as to detachably secure the terminal plate to the shank, said side margin of the terminal plate having an outwardly open notch intersecting the channel therein and the contained latch arm at a point outwardly of the shank end; whereby to give access to the latch arm for latch piece releasing manipulation thereof for detachment of the terminal plate from the shank, terminal posts carried by opposite faces of the terminal plate to which heating element leads together with corresponding conductors of a current service cord are respectively connected in straddling relation to the terminal plate, and a tubular handle detachably connected with said shank in enveloping relation to the projecting terminal plate as normally attached to said shank.

2. In an electric soldering iron having a head equipped with an electric heating element, said head having an outwardly open tubular shank through which leads of said heating element extend, a non-conductive flat terminal plate of width corresponding to the internal diameter of said shank, whereby the inner end portion of said terminal plate can be entered in the open end portion of said shank with its outer end portion projecting exteriorly from the latter, said terminal plate having coextensive longitudinal channels respectively outwardly open from its opposite side margins, said channels increasing in depth toward the inner end of said terminal plate, an inverted U-shaped latching member supported in connection with the outer end of said terminal plate and having inwardly yieldable dependent latch arms respectively disposed within said respective channels normally flush with the side margins of the terminal plate, latch pieces projecting outwardly from free end portions of said latch arms, the walls of said shank having openings to normally receive said latch pieces so as to detachably secure the terminal plate to the shank, side margins of the terminal plate having outwardly open notches intersecting the channels therein and the contained latch arms at points outwardly of the shank end, whereby to give access to the latch arms for latch piece releasing manipulation thereof for detachment of the terminal plate from the shank, terminal posts carried by opposite faces of the terminal plate to which heating element leads together with corresponding conductors of a current service cord are respectively connected in straddling relation to the terminal plate, and a tubular handle detachably connected with said shank in enveloping relation to the projecting terminal plate as normally attached to said shank.

3. A terminal plate for an electric soldering iron comprising a non-conductive flat rectangular plate body adapted to be detachably coupled by an inner end portion thereof to and within the free open end of the tubular shank of the iron head for outward extension from said shank end, said plate body being of a width corresponding to the internal diameter of said shank, said plate body having in at least one side margin thereof an outwardly open longitudinal channel coextensive therewith and increasing in depth toward the inner end thereof, a yieldable latch arm fixed by one end to the outer end portion of the plate body and disposed within said channel for dependent extension therethrough normally flush with the adjacent side margin of the plate body, a latch piece outwardly projecting from the free end portion of said latch arm to normally engage in an opening in the wall of said shank whereby to detachably secure the plate body to the shank, said side margin at the outer end portion of the plate body having an outwardly open notch intersecting said channel and the contained latch arm, whereby to give access to the latch arm for latch piece releasing manipulation thereof for detachment of the plate body from said shank, and electric conductor engageable terminal posts carried by opposite faces of the plate body.

4. A terminal plate for an electric soldering iron comprising a non-conductive flat rectangular plate body adapted to be detachably coupled by an inner end portion thereof to and within the free open end of the tubular shank of the iron head for outward extension from said shank end, said plate body being of a width corresponding to the internal diameter of said shank, said plate body having coextensive longitudinal channels respectively outwardly open from its opposite side margins and increasing in depth toward the inner end thereof, an inverted U-shaped latching member supported in connection with the outer end of the plate body and having inwardly yieldable latch arms respectively disposed within said respective channels normally flush with the side margins of the plate body, latch pieces outwardly projecting from the free end portions of said latch arms to normally engage in openings in the wall of the shank whereby to detachably secure the plate body to the shank, the side margins of the outer end portion of the plate body having outwardly open notches intersecting said channels and their contained latch arms, whereby to give access to the latch arms for latch piece releasing manipulation thereof for detachment of the plate body from said shank, and electric conductor engageable terminal posts carried by opposite faces of the plate body.

References Cited in the file of this patent

UNITED STATES PATENTS

| Number | Name | Date |
| --- | --- | --- |
| 1,027,337 | Holmes | May 21, 1912 |
| 1,154,415 | Kuhn et al. | Sept. 21, 1915 |
| 1,298,858 | Anthony | Apr. 1, 1919 |
| 2,346,327 | Pfeiffer | Apr. 11, 1944 |
| 2,624,774 | Cunningham | Jan. 6, 1953 |
| 2,658,983 | Talbot | Nov. 10, 1953 |